US012639469B2

(12) United States Patent
Gong et al.

(10) Patent No.: US 12,639,469 B2
(45) Date of Patent: May 26, 2026

(54) PERMISSIONS MANAGEMENT FOR QUERIES IN A GRAPH

(71) Applicant: TigerGraph, Inc., Redwood City, CA (US)

(72) Inventors: Qing Gong, Redwood City, CA (US); Mingxi Wu, Redwood City, CA (US)

(73) Assignee: TigerGraph, Inc., Redwood City, CA (US)

( * ) Notice: Subject to any disclaimer, the term of this patent is extended or adjusted under 35 U.S.C. 154(b) by 62 days.

(21) Appl. No.: 18/304,865

(22) Filed: Apr. 21, 2023

(65) Prior Publication Data

US 2023/0342486 A1 Oct. 26, 2023

Related U.S. Application Data

(60) Provisional application No. 63/333,834, filed on Apr. 22, 2022.

(51) Int. Cl.
G06F 21/62 (2013.01)
G06F 16/2455 (2019.01)

(52) U.S. Cl.
CPC .... G06F 21/6227 (2013.01); G06F 16/24553 (2019.01)

(58) Field of Classification Search
CPC ........................ G06F 16/24553; G06F 21/6227
See application file for complete search history.

(56) References Cited

U.S. PATENT DOCUMENTS

| | | | | |
|---|---|---|---|---|
| 7,185,192 B1 * | 2/2007 | Kahn | .................. | G06F 21/6218 707/999.102 |
| 7,284,265 B2 * | 10/2007 | Choy | .................. | G06F 21/6218 726/6 |
| 8,763,082 B2 * | 6/2014 | Huber | ................ | G06Q 20/3223 709/225 |
| 8,826,407 B2 * | 9/2014 | Henderson | ............ | H04L 63/102 726/8 |
| 8,893,228 B2 * | 11/2014 | Faitelson | .............. | G06F 16/156 726/2 |
| 8,938,598 B2 * | 1/2015 | Jones | ....................... | G06F 12/02 711/170 |
| 8,984,624 B2 * | 3/2015 | Perumal | .................. | G06F 21/30 726/17 |
| 9,558,343 B2 * | 1/2017 | Beauregard | ............. | G06F 9/468 |
| 9,654,474 B2 * | 5/2017 | Peretti | ..................... | H04L 63/10 |
| 9,703,978 B2 * | 7/2017 | Lim | ....................... | H04L 63/101 |
| 9,767,268 B2 * | 9/2017 | Truong | ............... | G06F 21/6227 |
| 10,073,979 B2 * | 9/2018 | Von Kaenel | ........... | G06F 16/29 |
| 10,282,299 B2 * | 5/2019 | Mukherjee | ............ | G06F 12/084 |
| 10,592,424 B2 * | 3/2020 | Beard | ..................... | G06F 12/084 |
| 11,086,787 B2 * | 8/2021 | Campbell | ............. | G06F 12/145 |
| 11,108,828 B1 * | 8/2021 | Curtis | ..................... | H04L 63/20 |

(Continued)

*Primary Examiner* — Miranda Le

(57) ABSTRACT

Systems, methods, and software described herein manage permissions in association with a query to a graph. In one example, a method of managing the permissions includes identifying a request for a query operation. In response to the request, the method further provides for identifying an access control list (ACL) in association with the query operation and identifying whether the query operation is permitted based on the ACL. The method further includes, in response to determining that the query operation is permitted, initiating the query operation.

17 Claims, 5 Drawing Sheets

(56)  References Cited

U.S. PATENT DOCUMENTS

| | | | |
|---|---|---|---|
| 11,768,781 B2 * | 9/2023 | Cooray | ............... G06F 12/1036 |
| | | | 710/110 |
| 11,829,763 B2 * | 11/2023 | Chou | ................. G06F 12/0802 |
| 12,001,370 B2 * | 6/2024 | Taylor | ................. G06F 13/4022 |
| 2006/0282900 A1 * | 12/2006 | Johnson | ................ G06F 21/604 |
| | | | 726/26 |
| 2016/0267016 A1 * | 9/2016 | Lee | ......................... G06F 9/455 |
| 2020/0183854 A1 * | 6/2020 | Johns | ................. G06F 12/1036 |
| 2022/0148123 A1 * | 5/2022 | Iyer | ....................... A63F 13/355 |

* cited by examiner

GENERATE A FIRST QUERY TO APPLY TO ONE OR MORE GRAPH DATABASES ~201

GENERATE AN ACCESS CONTROL LIST IN ASSOCIATION WITH THE FIRST QUERY ~202

ASSIGN PERMISSIONS ASSOCIATED WITH ONE OR MORE USERS IN THE ACCESS CONTROL LIST ~203

DISTRIBUTE THE FIRST QUERY AND THE ACCESS CONTROL LIST TO A DEPLOYMENT ENVIRONMENT ~204

200

PERMISSIONS MANAGEMENT FOR QUERIES IN A GRAPH

RELATED APPLICATIONS

This application hereby claims the benefit of and priority to U.S. Provisional Application No. 63/333,834, titled "PERMISSIONS MANAGEMENT FOR QUERIES IN A GRAPH," filed Apr. 22, 2022, which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from first point to a second point is the same as a line from the second point to the first point. In a directed graph, the two directions are treated as distinct directed edges.

In addition to storing the data, graph software can permit users to generate and use queries that can identify relevant attributes in the data set, condense the data set, add new information to the data set, or provide some other operation in association with the graph data. The queries can include multiple lines of code to implement the desire operation, wherein the code can include traversal language or other programming languages associated with the graph data. However, difficulties can arise for a developer in securing the code to implement the various queries.

OVERVIEW

Provided herein are systems and methods to manage permissions associated with queries and data for a graph. Specifically, the systems and methods can be used to provide an access control list (ACL) mechanism to protect queries and catalog objects, where an administrator or superuser in an environment can reset any user password but is incapable of accessing and changing the ACL protected object. In one implementation, a method includes identifying a request for a query operation and determining whether a query for the query operation is associated with an access control list (ACL), wherein the ACL identifies available operations for one or more users. The method further provides when the query is associated with an ACL, determining whether the query operation is permitted based on the ACL and an identifier for a user initiating the request and initiating or blocking the query operation based on whether the operation is permitted. The method also includes when the query is not associated with an ACL, determining whether the user initiating the request is allocated a role that permits the query operation, and permitting or blocking the query operation based on whether the user is allocated a role that permits the query operation.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
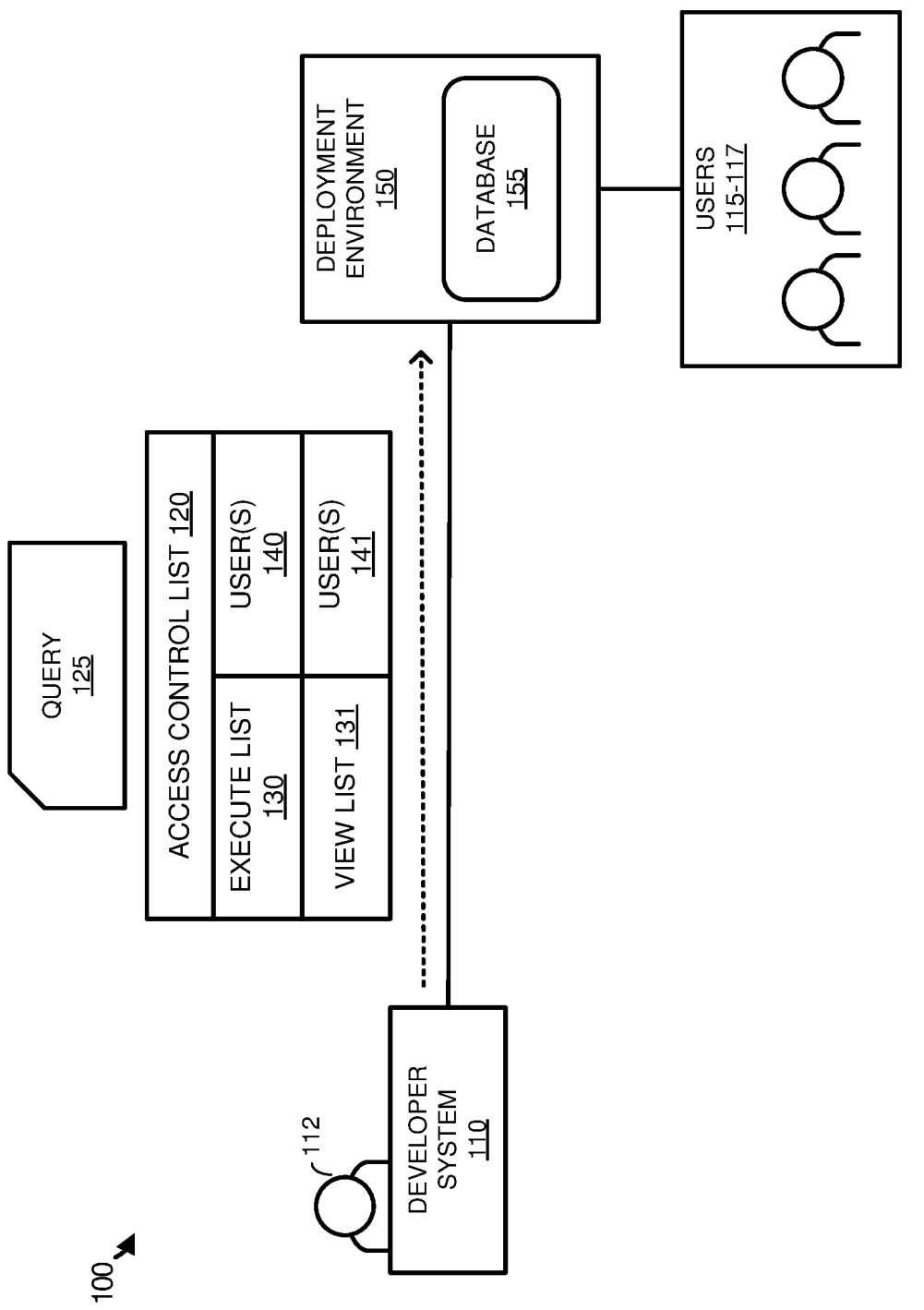
FIG. 1 illustrates a computing environment to manage permissions associated with a query according to an implementation.

FIG. 1 illustrates a computing environment 100 to manage permissions associated with a query according to an implementation. Computing environment 100 includes developer system 110, deployment environment 150, developer 112, users 115-117, query 125 and access control list (ACL) 120. ACL 120 is associated with query 125 and includes execute list 130 and view list 130-131 with users 140-141. Deployment environment 150 may include one or more computing systems that provide database 155, wherein database 155 may comprise a graph database that comprises vertices and edges to represent various data and connections.

In computing environment 100, deployment environment 150 provides a platform for database 155 that can be used to represent a social network, transactions, an organization structure, or some other information. For example, database 155 may represent a social network that uses vertices to represent users of the social network and edges to represent connections between the users. In addition to storing the data as part of database 155, deployment environment 100 may also include various tools to view, manipulate, and manage the data. The visualization tools can be used to view specific portions of the data, add, or remove data in the database, or provide some other operation in association with the database. In some implementations, the software provided to support database 155 may include queries that can be executed by a user of users 115-117 to provide. The queries may be used to identify specific data within database 155, identify relationships between the data, or provide some other information in association with the data in database 155. Each of the queries may include lines of code that are used to define the actions required to implement the desire query. The code may be written in a traversal language, C, or some other programming language.

In some implementations, the software that is provided to deployment environment may include one or more queries that can be used to support desired operations in deployment environment 150. The one or more queries can be generated by developer 112, wherein the queries may be use case specific to the organization associated with deployment environment 150, may be specific to a type of database, or may provide some other query operation in association with database 155. Here, to protect the queries provided by developer 112, a developer may generate an ACL 120 that is associated with a and manages the permissions associated with a query 125. Specifically, when query 125 is generated, developer 112 may generate a request to attach an ACL to query 125, wherein control of the ACL may be associated with a password, a user identifier, or some other information associated with developer 112. Once ACL 120 is created, developer 112 may add or remove permissions associated with various users that permit the users to execute query 125 or view the contents (i.e., code) associated with query 125. Here, ACL 120 includes two lists, execute list 130 with user(s) 140 and view list 131 with user(s) 141. Developer 112 may assign one or more users to the lists or may exclude all users in the list. For example, view list 131 may indicate that all users should be prevented from reading or viewing the code associated with query 125.

After query 125 is generated, query 125 and ACL 120 are provided to deployment environment 150. Once provided, users 115-117 may initiate query operations in association with query 125. The query operations may request to execute query 125 or view query 125. As an example, user 115 may generate a request to execute query 125. In some implementations, the request may include providing one or more variables associated with the query, providing path information or other identifiers associated with database 155, or providing some other information required by query 125. In some implementations, query 125 may comprise a function, wherein the user may call the function with any required information for executing the query. In response to the request, the software at deployment environment 150 may determine whether the query operation is permitted in association with user 115. In some implementations, credentials may be identified in association with the user, wherein the credentials may include a username, passcode, key, or some other identifying information. The information is then compared to the information of ACL 120 to determine whether the query operation is permitted. For example, if user 115 is permitted to execute query 125, then the query may be initiated on database 155. However, if user 115 is not permitted to execute the query, then the query may be blocked from being implemented.

In some implementations, the password or other credential information associated with updating and modifying the ACL may be configured to be unmodifiable, preventing other users including users with superuser access to update and access the ACL. Advantageously, developer 112 may attach a unique credential (i.e., password) to ACL 120 that prevents other users without the unique credential from modifying the ACL. Additionally, the unique credential may be attached in a manner that prevents modification to the password, even with superuser access at deployment environment 150. This may be accomplished using encryption and other mechanisms to secure the ACL to the credentials associated with developer 112. Once created, a user's credential information may be compared to the information in the ACL to determine whether the requested operation in association with the query is permitted.

Although demonstrated with an ACL in the example of computing environment 100, one or more queries that are provided to deployment environment 150 may not include an ACL. For example, developer 112 may generate a query that is provided as part of a software package for database 155. When a query operation is requested, a check operation in deployment environment 150 may determine whether an ACL is available for the query. If no ACL is available, then deployment environment 150 may determine whether any role-based access controls (RBACs) are available in association with the query operation. RBACs may be used to limit access to queries in deployment environment 150 based on roles allocated to the users. This may permit different subsets of users to execute different queries on database 155. For example, if user 115 generated an execute query operation, deployment environment 150 may first determine whether ACL is available in association with the query. If no ACL is available, deployment environment 150 may identify a RBAC list or other data structure associated with the query. The RBACs may indicate a list of users or types of users that are able to perform different operations in association with a query. The RBACs may use a username, password, or some other user identifier to identify the user generating the query and compare the identifier to roles contained within the RBAC data structure. If the query operation is permitted, then the operation can be executed. Otherwise, the query operation can be blocked, preventing the execution of the corresponding operation.

Figure 2:
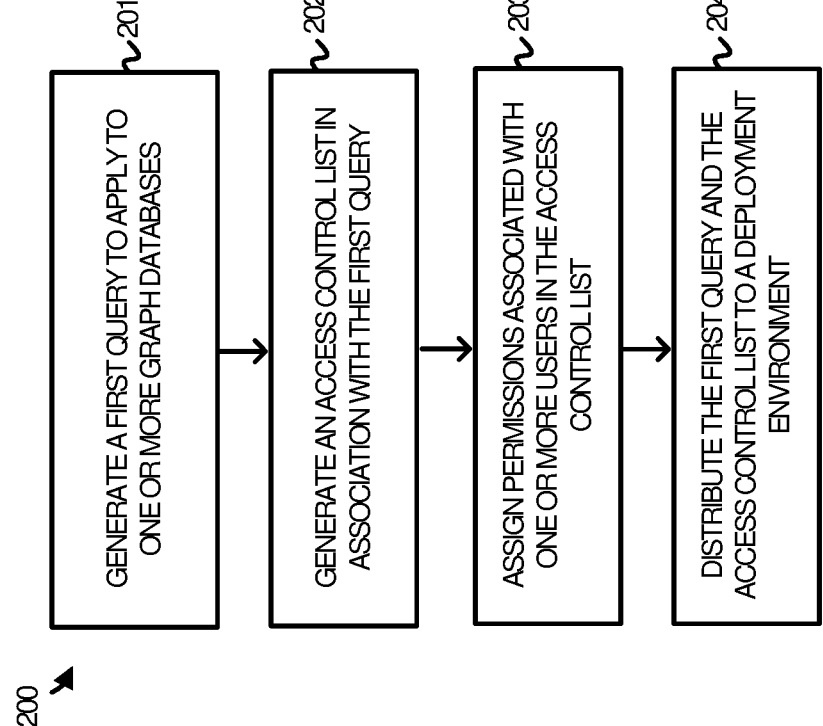
FIG. 2 illustrates a method of managing permissions associated with a query according to an implementation.

FIG. 2 illustrates a method 200 of managing permissions associated with a query according to an implementation. The steps of method 200 are referenced parenthetically in the paragraphs that follow with reference to systems and elements of computing environment 100 of FIG. 1. Method 200 may be performed by developer system 110 of FIG. 1 in some examples, wherein developer 112 may generate a query to be performed in deployment environment 150.

Method 200 includes generating (201) a first query to apply to one or more graph databases. The query may be used to identify specific information in the graph, compare information in the graph, or provide some other information in association with the graph. In some implementations, the first query may comprise a function that can be called by a user at deployment environment to perform the query. The function may define one or more variables that should be included by the user, wherein the variables may include data of interest (e.g., names, values, and the like) or may include some other information required to perform the desired query. Additionally, the function may include lines of code written by developer 112 to perform the desired operation. The lines of code may be used to traverse the graph, process the data identified in the graph, or provide some other operation in association with the graph. For example, query 125 may comprise a function call of "foo" that executes a plurality of lines of code to perform the desired operation.

In addition to developing the first query, method 200 further provides, in response to a developer request, generating (202) an ACL in association with the first query. The ACL may comprise a file structure that indicates lists of one or more users that are permitted to execute the query, view the query, or implement some other operation in association with the query. The ACL may comprise a file that is linked to the query, such that when the query operation is requested, the ACL is applied prior to initiating the requested operation. The ACL may include fields that indicate available operations, such as to view or execute query, and user identifiers for users that are permitted to implement the corresponding operation. The ACL may be encrypted and linked to the developer, such that the developer can control the permissions in the ACL. After the ACL is generated, method 200 further includes assigning (203) permissions associated with one or more user in the ACL.

Referring to the example in computing environment 100, developer 112 may add user information to users 140-141 corresponding to execute list 130 and view list 131. The user information may indicate that all users are permitted to implement the operation, that all users are not permitted to implement the operation, or that a limited subset of users are permitted to implement the operation. Once the developer assigns permissions to the users, method 200 further includes distributing (204) the first query and the ACL to a deployment environment, wherein the deployment environment may comprise one or more computing systems capable of supporting query operations on at least one database.

After query 125 and ACL 120 are provided to deployment environment 150, users 115-117 may request operations in association with the query. A security process, executing as part of deployment environment 150, may identify the operation requests and interrupt the requests prior to initiating the corresponding operation. The security process may identify credentials or identifier information associated with the requesting user and compare the information to the information in ACL 120. If the operation is permitted, then the security process may initiate the requested operation. Otherwise, when the operation is not permitted, then the security process may block the operation. In at least some implementations, the query may be encrypted limiting access to viewing and executing the query when the appropriate permissions are available to a user. Advantageously, a developer of a query may prevent other users from copying or distributing the query by limiting access to the execution and view of the query code.

In at least one implementation, when the developer generates the query with the code to execute the query, the query can be distributed as part of a larger package that can include additional queries, software to add, manipulate, or maintain the database, or provide some other functionality. The developer can generate the ACL and provide a unique credential (ACL password) that is required to access and update the ACL. Once the ACL is distributed with the query, the password is used to protect the ACL, such that only users permitted by the developer can perform operations in association with the query. Even with superuser credentials in the deployment environment, the superuser may update the password in association with the ACL owner but may not update or modify the ACL.

In some implementations, the developer may indicate that no users are permitted to access or view the code associated with a query. Accordingly, even when the query is deployed in a deployment environment, a superuser or some other user may not modify the ACL or view the query as the ACL expressly indicates that the user. In some implementations, where a user is permitted to view the query, a superuser may access the query by resetting a user password or using the superuser permissions to act in place of the designated user. By specifying that no users or "nobody" can view the query in the read portion of the ACL, all users, including superusers, will be unable to access the code in association with the query. Additionally, while a superuser may attempt to change a user password, the ACL password may be locked preventing modifications to the ACL and undesirable operations in association with the query.

Figure 3:
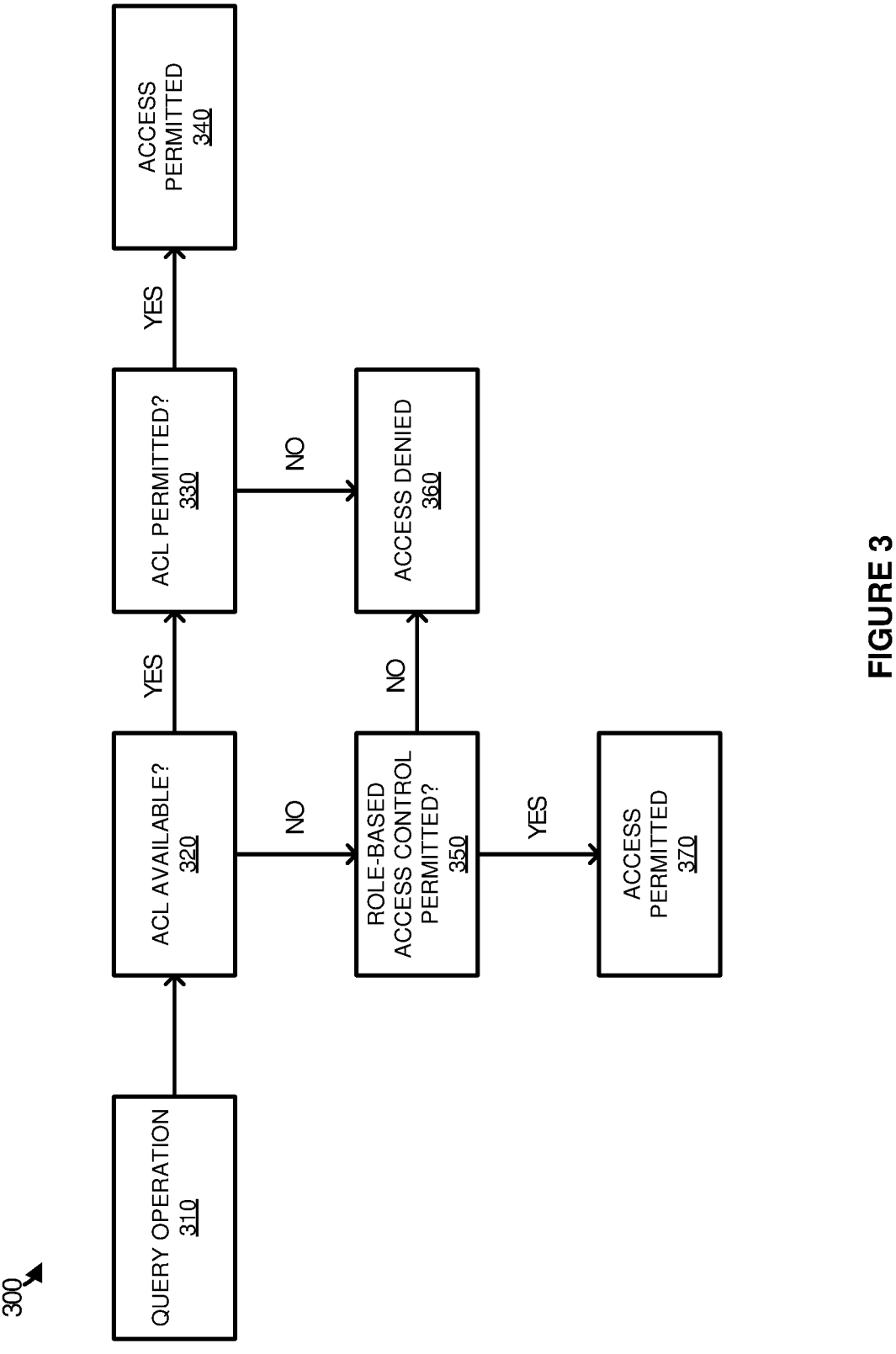
FIG. 3 illustrates an operational scenario processing permissions associated with a query according to an implementation.

FIG. 3 illustrates an operational scenario 300 processing permissions associated with a query according to an implementation. The steps of operational scenario 300 are referenced parenthetically in the paragraphs that follow. Operational scenario 300 is representative of the operations that can be performed by a security process in a deployment environment for one or more graphs.

As depicted, operational scenario 300 includes identifying (310) a query operation from an end user. The query operation may be used to identify specific data attributes within a graph database, modify one or more attributes in the graph database, identify links or associations between vertices or nodes of the graph database, or perform some other query operation in association with a graph database, including combinations thereof. In response to identifying the query operation request, the security process will determine (320) whether an ACL is available in association with the query. An ACL comprises a file that is used to associate various operations for a query with users available to initiate those operations. A deployment environment for a graph database may include a repository of queries that are available to be deployed, wherein at least a portion of the queries may be associated with an ACL defined by a developer or creator of the ACL. When an ACL is available for the query, the security process will determine (330) whether the ACL indicates that the user is permitted to perform the requested operation. When the operation is permitted, the security process may initiate (340) the requested operation. In contrast, when the operation is not permitted, the security process may deny (360) the requested operation.

In some implementations, when a request is generated by a user, user information, including identifiers, credentials, or some other information is identified by the security process. The credentials can be compared to the information in the ACL to determine whether the requested operation is permitted. Specifically, whether operation is permitted for the user based on the ACL and the identity of the user. For example, a user identifier may be compared to identifiers provided in the ACL to determine whether the individual user is permitted to implement the requested operation. In at least some implementations, the developer of a query may generate an ACL and assign permissions that prevents all users from accessing a particular operation. This operation may comprise a view operation, allowing a user to view the code associated with the query. Advantageously, any user that initiates the request may be prevented from accessing the code associated with the query. This can prevent the code from being used in environments that have not purchased a license or are undesirable by the developer of the query.

In some implementations, the query operation may correspond to a query that is not associated with an ACL. In response to determining that the query operation is not associated with an ACL, the security operation can determine (350) whether query operation 310 is permitted based on RBACs for the computing environment. In some implementations, the RBACs may comprise one or more files that permit or block subsets of users from performing various query operations. Unlike the ACL, which can be defined by the developer or creator of a query, the RBACs may be defined by an administrator of the deployment environment. The RBACs may be used by an administrator to limit the type of users that perform various operations in the environment. The subsets of users in RBACs may be defined using roles, wherein a first set of users may be assigned or allocated a first role, while a second set of users may be allocated a second role. In some examples, users may have more than one role in some examples. In response to a query operation, the security process may identify a role associated with the user and determine whether the requested operation is permitted based on the RBACs. For example, the RBACs may indicate that a first set of users with a first role can execute queries on a graph database and may further indicate that a second set of users with a second role cannot execute queries. After applying the RBACs to the requested query operation, the security process may initiate (370) the query operation when the query operation is permitted or may deny (360) the query operation when the query operation is not permitted.

In some implementations, when an ACL is associated with the query, the ACL is assigned a unique credential or password that permits the developer of the query to modify the permissions in the ACL. The credential or password may be locked to the ACL, such that even a superuser in the deployment environment cannot modify the ACL, which may include encrypting the ACL in some examples. Advantageously, the query with the ACL can be shipped with other database services and applications, including other queries, but be secured by the individual developer associated with the query. This can permit multiple developers to include queries in a software package for a deployment environment, while individually securing the queries. Additionally, the credential or password associated with the ACL owner may be unmodifiable with superuser permissions. Specifically, while a superuser in a deployment environment may generate a request to change the password associated with the ACL, the new password specified by the superuser will be unable to decrypt or modify the ACL.

In some examples, when an ACL is assigned to a query, the developer of the query may expressly indicate that no users (or a "nobody" special rule) should be able to view the code associated with the query. Specifically, as each query may include different operations associated with the query, the developer may indicate that no users should be able to execute the view operation. Once the ACL is configured such that no users can view the query, a superuser in the computing environment cannot impersonate or change the password associated with any user to view the query. Additionally, a superuser cannot access or modify the ACL to add a user to the view list. Only a user with the developer credentials (i.e., the ACL password) can modify the ACL list to include new users.

Figure 4:
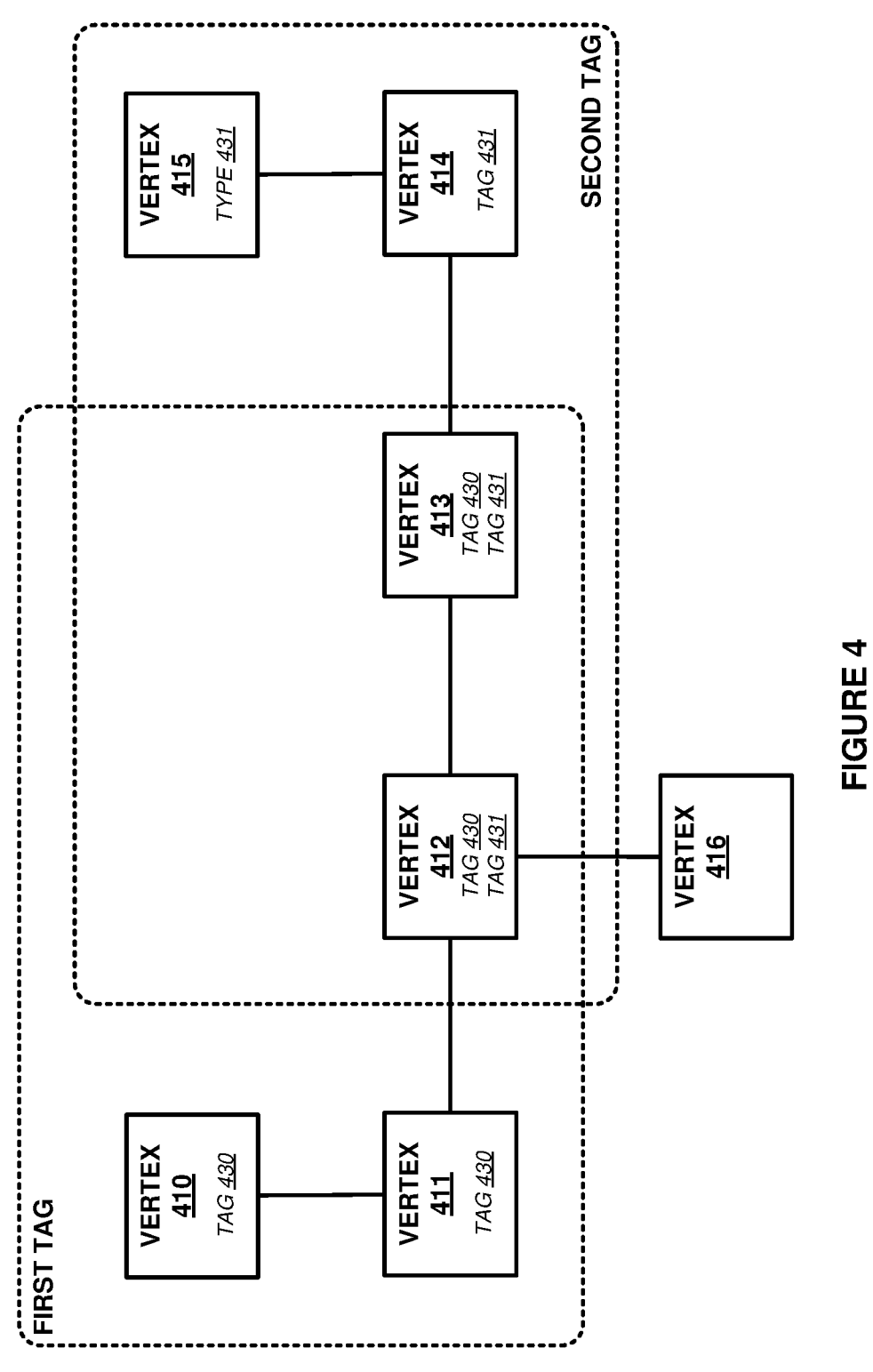
FIG. 4 illustrates a graph with security tags to manage access permissions associated with vertices according to an implementation.

FIG. 4 illustrates a graph 400 with security tags to manage access permissions associated with vertices according to an implementation. Graph 400 includes vertices 410-416 and tags 430-431. Although demonstrated in the examples of FIGS. 1-3 as implementing ACLs and RBACs in association with queries, a deployment environment may further implement permissions or security in association with data in the database. Graph 400 is representative of a data set with security tags to manage access restrictions to vertices in the graph.

In a graph database environment, vertices are generated that represent different data. The data may comprise users of a social network, products, organizational information, or some other data. Here vertices 410-416 exist in graph 400 that can represent various data types. In addition to the data, tags 430-431 are applied to vertices to provide access permissions to the vertices. Specifically, tag 430 is applied to vertices 410-413, while tag 431 is applied to vertices 412-415. The tags may be applied based on the type of data represented by the vertex, values included as part of the vertex (e.g., names, numerical values, and the like), may be applied manually by an administrator associated with graph 400, or may be applied in some other manner. The tags may be applied when the data is ingested to create the graph or may be added after the data is included in the graph.

In some implementations, tags 430-431 may be used to limit access to data in graph 400. For example, tags 430-431 may be used to limit access to a set of users, wherein users associated with a particular tag may access the vertices with the tag. When a user initiates the execution of the query, the graph environment may first determine whether the user is permitted to execute the query using ACLs and/or RBACs. If the query is permitted, then the environment may determine data available to the user and may supply. For example, user identifier information may associate the user with tag 430. The user identifier information may include a username, password, key, or some other identifier information. The information may then be compared to a data structure to determine tags associated with the user. With the user able to access tag 430, vertices with tag 430 may be identified to support the query and only vertices with the tag will be used in responding to the query. In some examples, vertices without tags may also be used to support the query request, wherein vertices without tags will not be deemed sensitive.

In other implementations, the user generating the query may indicate one or more tags for the query. As a result, vertices with the corresponding tag can be used to resolve the query. For example, a user may generate a request to execute a query. In response to the request, the environment may determine whether the user is permitted to execute the query using an ACL associated with the query or a RBAC configuration for the environment. If the query is permitted, the environment may identify vertices with the required tag or tags and use the vertices to respond to the query. Thus, if the user required both tags 430-431, the environment would identify vertices 412-413 to support the request and perform the query operation on vertices 412-413.

Figure 5:
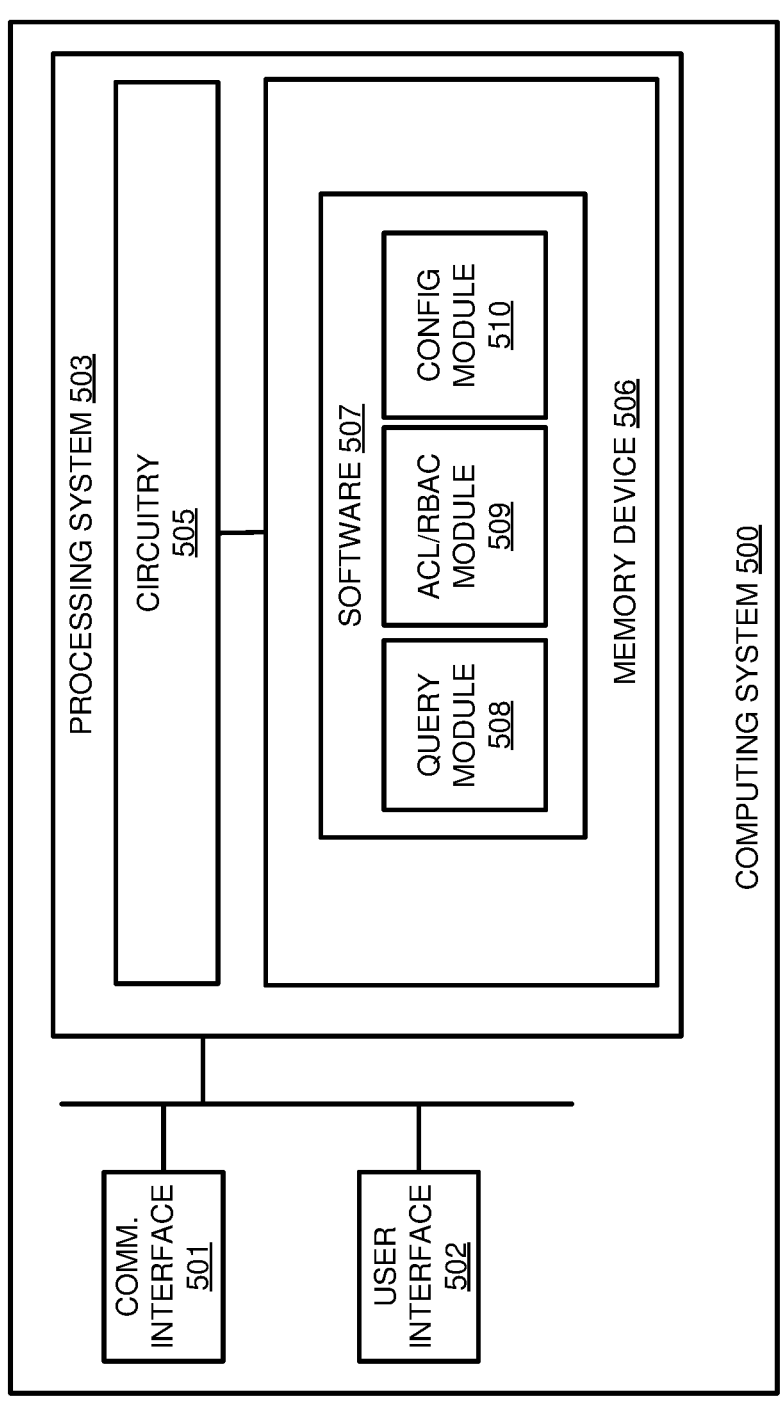
FIG. 5 illustrates a computing system to manage permissions associated with a query according to an implementation.

FIG. 5 illustrates a computing 500 system to manage permissions associated with a query according to an implementation. Computing system 500 is representative of any computing system or systems with which the various operational architectures, processes, scenarios, and sequences disclosed herein for query security management. Computing system 500 may be representative of a computing system in deployment environment 150 of FIG. 1 capable of managing security policies for one or more queries, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 may be configured to communicate with client computing systems, wherein the client computing systems may provide requests for various query operations. Communication interface 501 may also be configured to communicate with one or more development of software distribution computing systems capable of providing software for interacting with graph databases.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable, and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes maintain module graph module 508, query module 509, and configuration module 510, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, configuration module 510 directs processing system 503 to identify a request to generate a query. A query may comprise a function call that in turn executes code that provides a desired operation on a database. The query may be used to identify specific data within the database, manipulate the data in the database, or provide some other operation in association with the database. In some implementations, the database may comprise a graph database. In addition to identifying the query, the developer may request to generate an ACL that corresponds to the query. In response to the request, configuration module 510 directs processing system 503 to generate the ACL and assign available operations to one or more users in the ACL based on preferences from the developer. In some implementations, the ACL may be used to associate various operation for the query with users available to perform the operations, wherein the operations may comprise executing the query, viewing the query, or performing some other operation in association with the query. For example, an ACL may prevent all users from viewing the query but may permit one or more users to execute the ACL. Once the query is generated with the associated ACL, configuration module 510 directs processing system 503 to distribute the ACL with the query to a deployment environment. Although demonstrated in the current example as deploying the query as part of the same computing system, the query and ACL may be distributed to other computing environments in some examples. For example, the query and ACL may be developed on a first computing system and deployed in a computing environment comprising one or more other computing systems.

After queries are deployed with ACLs, query module 508 directs processing system 503 to identify a request for a query operation. In response to the request ACL/RBAC module 508 directs processing system 503 to determine whether the query for the query operation is associated with an ACL. When the query is associated with an ACL, ACL/RBAC module 508 directs processing system to identify whether the query operation is permitted based on the ACL and an identifier for the user initiating the request, and block or initiate the operation based on whether the operation is permitted. For example, a first user may generate a request to execute a query. In response to the request, computing system 500 may determine whether the user is permitted to execute the query based on identifier information for the user and the ACL. The identifier information may comprise a username, password, token, or some other identifiable information associated with the user. When the user is permitted, ACL/RBAC module 508 directs processing system 503 to initiate the requested operation. However, if the user is not permitted, ACL/RBAC module 508 directs processing system 503.

In some implementations, a query may not be associated with an ACL. In these examples, when a query operation is requested, ACL/RBAC module 508 directs processing system 503 to determine a role associated with the user initiating the request. In some implementations, an organization may allocate roles to separate or distinguish between different subsets of users. For example, first set of users may be permitted to execute a first set of queries, while a second set of users may be permitted to execute a second set of queries. A role can comprise one or more tags associated with each of the users and the RBACs may comprise one or more files that indicate available operations associated with each of your roles. After a request is identified, ACL/RBAC module 508 directs processing system 503 identifies a role associated with the user and determines whether the query operation is permitted based on the role. If permitted, the query operation is initiated, however, if the query operation is not permitted the operation can be blocked. In some implementations, a notification can be provided to the user indicating that the operation was blocked and may provide information about what triggered the operation being blocked (e.g., an RBAC role that prevented the operation), wherein the RBAC roles may each be assigned to one or more users.

Although described in the previous example as using ACLs and RBACs to limit queries in association with graph databases. Permissions may also be used to limit access to data in the database. In some implementations, vertices and/or edges in the graph can be associated with tags that can be used to limit access to specific portions of the graph. The tags may define individual users that can access vertices or edges, subsets of users (e.g., roles) that can access vertices or edges, or some other information. For example, a first set of vertices may be allocated a first tag, while a second set of vertices may be allocated a second tag. In some implementations, a vertex or edge can be allocated multiple tags. When a query is generated, tags associated with the query can be identified, limiting the set of data that the query is applied. For example, when a user initiates a query on a graph database, software 507 may direct processing system 503 to identify a subset or vertices and/or edges available to the user. This may include identifying vertices with a tag or tags permitted to be accessed by the user, or vertices with tag or tags defined by the user as part of the query. Vertices that do not include the requisite tag or tags can be ignored in providing the response to the query.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

receiving a request, in a deployment environment, for a query operation related to a query generated by a developer system;

in response to the request, identifying an access control list (ACL) associated with the query operation and deployed by the developer system to the deployment environment, wherein:

the ACL comprises a view list and an execute list, the view list defining users permitted to read code associated with the query and the execute list defining users permitted to execute the query, the ACL takes precedence over a role-based access control (RBAC) separate from the ACL, wherein the RBAC assigns users to roles and defines which roles are permitted to perform operations associated with the query, the RBAC is defined by an administrator of the deployment environment, and the administrator of the deployment environment is prevented from modifying the ACL;

identifying permissions associated with vertices in a graph;

identifying one or more vertices of the vertices accessible by a user initiating the request; and in response to determining, based on the ACL, that the user has permission to perform the query operation, initiating the query operation, wherein initiating the query operation comprises initiating the query operation on the one or more vertices accessible by the user.

2. The method of claim 1, wherein the query operation comprises an operation to execute the query.

3. The method of claim 1, wherein the query operation comprises an operation to read the query.

4. The method of claim 1 further comprising:

in response to a request from a developer, generating, in the developer system, the ACL associated with the query;

assigning permitted query operations to the user in the ACL based on preferences from the developer; and distributing the ACL with the query to the deployment environment.

5. The method of claim 4, wherein generating the ACL comprises assigning a password to the ACL, wherein the password permits modifications to the ACL.

6. The method of claim 4, wherein the deployment environment comprises one or more computing systems to support a graph database.

7. The method of claim 1, wherein the graph comprises a social network or organizational structure graph.

8. A computing apparatus comprising:

a storage system;

a processing system operatively coupled to the storage system; and program instructions on the storage system that, when executed by the processing system, direct the computing apparatus to:

receive a request, in a deployment environment, for a query operation related to a query generated by a developer system;

in response to the request, identify an access control list (ACL) associated with the query operation and deployed by the developer system to the deployment environment, wherein:

the ACL comprises a view list and an execute list, the view list defining users permitted to read code associated with the query and the execute list defining users permitted to execute the query, the ACL takes precedence over a role-based access control (RBAC) separate from the ACL, wherein the RBAC assigns users to roles and defines which roles are permitted to perform operations associated with the query, the RBAC is defined by an administrator of the deployment environment, and the administrator of the deployment environment is prevented from modifying the ACL;

identify permissions associated with vertices in a graph;

identify one or more vertices of the vertices accessible by a user initiating the request; and in response to determining, based on the ACL, that the user has permission to perform the query operation, initiating the query operation, wherein initiating the query operation comprises initiating the query operation on the one or more vertices accessible by the user.

9. The computing apparatus of claim 8, wherein the query operation comprises an operation to execute the query.

10. The computing apparatus of claim 8, wherein the query operation comprises an operation to read the query.

11. The computing apparatus of claim 8, wherein the program instructions further direct the computing apparatus to:

in response to a request from a developer, generating, in the developer system, the ACL associated with the query;

assigning permitted query operations to the user in the ACL based on preferences from the developer; and distributing the ACL with the query to the deployment environment.

12. The computing apparatus of claim 11, wherein generating the ACL comprises assigning a password to the ACL, wherein the password permits modifications to the ACL.

13. The computing apparatus of claim 11, wherein the deployment environment comprises one or more computing systems to support a graph database.

14. The computing apparatus of claim 8, wherein the graph comprises a social network or organizational structure graph.

15. A method comprising:

receiving a request, in a deployment environment, for a query operation related to a query generated by a developer system;

determining whether the query is associated with an access control list (ACL), wherein the ACL comprises a view list and an execute list, the view list defining users permitted to read code associated with the query and the execute list defining users permitted to execute the query, and wherein the query and the ACL are generated by the developer system and deployed to the deployment environment;

in the event that the query is associated with an ACL:

identifying whether the query operation is permitted based on the ACL and an identifier for a user initiating the request;

in the event that the query operation is permitted:

identifying permissions associated with vertices in a graph, identifying one or more vertices of the vertices accessible by the user initiating the request, and initiating the query operation, wherein initiating the query operation comprises initiating the query operation on the one or more vertices accessible by the user; and in the event that the query operation is not permitted, blocking the query operation;

in the event that the query is not associated with an ACL:

determining whether the user initiating the request is allocated a role that permits the query operation in a role-based access control (RBAC) separate from the ACL, wherein the RBAC assigns users to roles and defines which roles are permitted to perform operations associated with the query, wherein the RBAC is defined by an administrator of the deployment environment, and wherein the administrator of the deployment environment is prevented from modifying the ACL;

in the event that the user is allocated a role that permits the query operation, initiating the query operation; and in the event that the user is not allocated a role that permits the query operation, blocking the query operation.

16. The method of claim 15, wherein the query operation comprises an operation to execute the query.

17. The method of claim 15, wherein the query operation comprises an operation to read the query.

\* \* \* \* \*